(12) United States Patent
Song et al.

(10) Patent No.: US 9,728,204 B2
(45) Date of Patent: Aug. 8, 2017

(54) METHOD AND DEVICE FOR DRAWING A NOISE MAP

(71) Applicant: SHENZHEN GRANDSUN ELECTRONIC CO., LTD., Shenzhen, Guangdong (CN)

(72) Inventors: Yanan Song, Guangdong (CN); Haiquan Wu, Guangdong (CN); Ruiwen Shi, Guangdong (CN); Xinian Geng, Guangdong (CN); Guozhong Du, Guangdong (CN); Jiayun Xu, Guangdong (CN)

(73) Assignee: SHENZHEN GRANDSUN ELECTRIC CO., LTD., Shenzhen, Guangdong (CN)

( * ) Notice: Subject to any disclaimer, the term of this patent is extended or adjusted under 35 U.S.C. 154(b) by 45 days.

(21) Appl. No.: 14/908,072

(22) PCT Filed: Jan. 26, 2015

(86) PCT No.: PCT/CN2015/071568
§ 371 (c)(1),
(2) Date: Jan. 27, 2016

(87) PCT Pub. No.: WO2016/119107
PCT Pub. Date: Aug. 4, 2016

(65) Prior Publication Data
US 2016/0372136 A1   Dec. 22, 2016

(51) Int. Cl.
*G10L 21/10* (2013.01)
*G06K 9/00* (2006.01)
(Continued)

(52) U.S. Cl.
CPC .......... *G10L 21/10* (2013.01); *G06K 9/00718* (2013.01); *G06T 11/206* (2013.01); *G10L 25/51* (2013.01); *G06K 9/00684* (2013.01)

(58) Field of Classification Search
CPC ............ G06K 9/00718; G06K 9/00684; G06T 11/206; G10L 25/51; G10L 21/10
See application file for complete search history.

(56) References Cited

U.S. PATENT DOCUMENTS

| | | | |
|---|---|---|---|
| 8,706,540 B2 * | 4/2014 | Mangat | G06Q 10/00 705/7.13 |
| 2010/0135502 A1 * | 6/2010 | Keady | A61B 5/121 381/58 |

(Continued)

FOREIGN PATENT DOCUMENTS

| CN | 102506991 | 6/2012 |
|---|---|---|
| CN | 102645271 | 8/2012 |

(Continued)

OTHER PUBLICATIONS

International Search Report for PCT/CN2015/071568, dated Sep. 10, 2015, 12 pages total.

*Primary Examiner* — Brenda Bernardi
(74) *Attorney, Agent, or Firm* — Hamre, Schumman, Mueller & Larson, P.C.

(57) ABSTRACT

The present invention is applicable to the technical field of noise maps and provides a method for drawing a noise map and device, the method for drawing a noise map comprises: obtaining an environmental noise uploaded by a terminal, the environmental noise includes a noise value, a time information, and a position information; when the terminal uploads a picture corresponding to the environmental noise, detecting whether the picture is a valid picture or not; when the picture is a valid picture and the position where the picture is taken lies indoor, identifying the environmental noise as an indoor environmental noise; when the picture doesn't exist, identifying the environmental noise as an outdoor environmental noise, or when the picture is invalid, identifying the environmental noise as an outer door envi- (Continued)

ronmental noise, or when the picture is a valid picture and the position where the picture is taken lies outdoor, identifying the environmental noise as the outdoor environmental noise; drawing a noise map according to the indoor environmental noise and the outdoor environmental noise. The present invention can not only improve drawing accuracy of the noise map, but also increase reliability of the noise map.

12 Claims, 7 Drawing Sheets

(51) Int. Cl.
*G06T 11/20* (2006.01)
*G10L 25/51* (2013.01)

(56) References Cited

U.S. PATENT DOCUMENTS

| 2011/0208518 | A1 | 8/2011 | Holtel et al. | |
|---|---|---|---|---|
| 2012/0237049 | A1* | 9/2012 | Brown | G10K 11/1788 381/71.1 |
| 2014/0192990 | A1* | 7/2014 | Cheng | G01H 3/125 381/56 |
| 2015/0110276 | A1* | 4/2015 | Gereb | H04R 29/008 381/56 |
| 2016/0025551 | A1* | 1/2016 | Lee | G01H 3/04 701/532 |
| 2016/0238437 | A1* | 8/2016 | Carlsen | G01H 3/125 |

FOREIGN PATENT DOCUMENTS

| CN | 103747087 | 4/2014 |
|---|---|---|
| CN | 103956101 | 7/2014 |
| CN | 104573387 | 4/2015 |
| JP | 2012-169838 | 9/2012 |
| KR | 20120055783 | 6/2012 |

* cited by examiner

METHOD AND DEVICE FOR DRAWING A NOISE MAP

TECHNICAL FIELD

The present application relates to the technical field of noise maps, and more particularly, relates to a method and device for drawing a noise map.

BACKGROUND

As the population increases and various kinds of devices increase, noise pollution sources are increasing as well. People needs a map about noise which is capable to show current noise everywhere and serving as guidance for his/her traps and other daily schedules, just like a real-time road condition map. Meanwhile, the improvement of hardware storage capability and computational capability, the development of cloud technology and big data technology, and the development of various new data mining machine learning and even deep mining technology provides a basis for implementation of drawing a location-related noise map.

However, a noise map drawing method in the prior art can't distinguish indoor environmental noise from outdoor environmental noise, and goes against the improvement of drawing accuracy of the noise map. This is because the noise map drawing method in the prior art can't distinguish the indoor environment noise from the outdoor environment noise, it can only draw mixed environmental noise and generate the noise map merely instead. However, noise is different from information such as weather conditions, road conditions, and so on, noise is very sensitive to the position thereof; it is possible that a strength of the same noise may vary obviously at two places being separated by a wall, and the strength of the noise may change suddenly due to various reasons as well. Therefore, for drawing a location-related noise map, it needs to distinguish the indoor environmental noise from the outdoor environmental noise.

Technical Problem

A purpose of an embodiment of the present invention is to provide a method for drawing a noise map, aiming at solving the problem that a noise map drawing method in the prior art is unable to distinguish indoor environmental noise from outdoor environmental noise, and goes against the improvement of drawing accuracy of the noise map.

BRIEF SUMMARY

Embodiments of the present invention are implemented by providing a method for drawing a noise map, comprising:

obtaining an environmental noise uploaded by a terminal, the environmental noise comprises a noise volume, time information, and position information;

when the terminal uploads a picture corresponding to the environmental noise, detecting whether the picture is a valid picture or not;

when the picture is a valid picture and the position where the picture is taken lies indoor, identifying the environmental noise as an indoor environmental noise;

when the picture does not exist, identifying the environmental noise as an outdoor environmental noise; or when the picture is an invalid picture, identifying the environmental noise as the outer door environmental noise; or when the picture is a valid picture and the position where the picture is taken lies outdoor, identifying the environmental noise as the outdoor environmental noise;

drawing a noise map according to the indoor environmental noise and the outdoor environmental noise.

The embodiments of the present invention also aim at providing a noise map drawing device, comprising:

an obtaining module configured for obtaining an environmental noise uploaded by a terminal, the environmental noise comprises a noise value, time information, and position information;

a valid picture detecting module configured for detecting whether the picture is a valid picture or not when the terminal uploads a picture corresponding to the environmental noise;

an indoor environmental noise module configured for identifying the environmental noise as an indoor environmental noise when the picture is valid and the position where the picture is taken lies indoor;

an outdoor environmental noise module configured for identifying the environmental noise as an outdoor environmental noise when the picture does not exist, or when the picture is invalid, or when the picture is valid and the position where the picture is taken lies outdoor;

and a noise map drawing module configured for drawing a noise map according to the indoor environmental noise and the outdoor environmental noise.

Beneficial Effects

In the embodiment of the present invention, the noise map is drawn according to the indoor environmental noise and the outdoor environmental noise, thereby solving the problem that the noise map drawing method in the prior art is unable to distinguish the indoor environmental noise from the outdoor environmental noise and thus it is not convenient for improving the drawing accuracy of the noise map. A noise relating the described position of the noise map can then be more accurate, thereby improving drawing accuracy of the noise map and improving reliability of the noise map as well.

DETAILED DESCRIPTION OF THE PREFERRED EMBODIMENT

In order to make the purpose, the technical features and the advantages of the present application be more clear, the present application will be described in detail with reference to accompanying drawings and embodiments. It should be understood that the specific embodiments described herein are used for interpretation of present invention merely, rather than the limitation to the present invention.

Embodiment One

Figure 1:
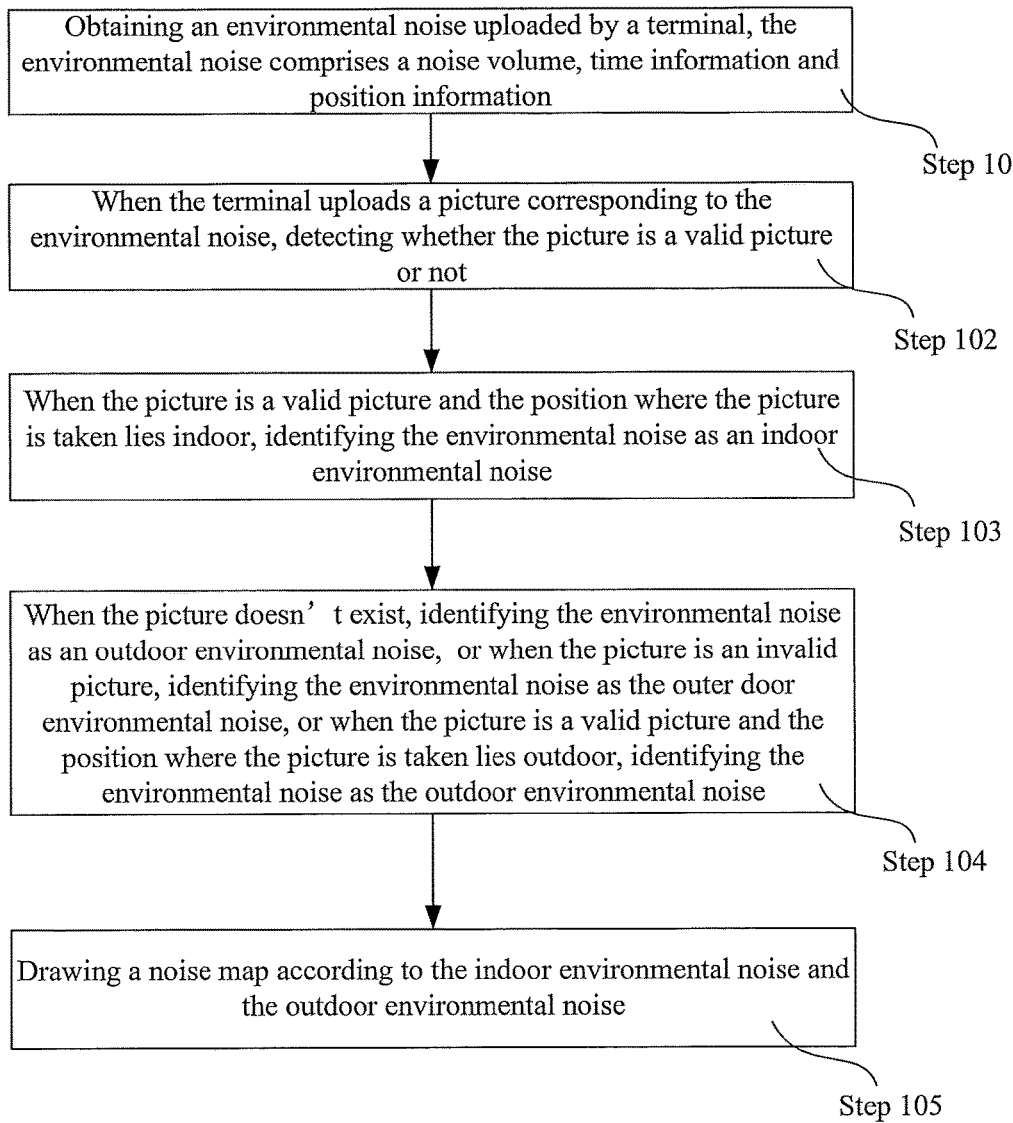
FIG. 1 illustrates an implementation flow chart of a method for drawing a noise map according to an embodiment of the present invention.

FIG. 1 is a flow chart for implementing a method for drawing a noise map provided by the embodiment of the present invention, the detail of which is explained as follows:

in a step 101, obtaining an environmental noise uploaded by a terminal, the environmental noise includes a noise value, time information, and position information;

wherein, the time information represents information about the time when the environmental noise is recorded, the time information can be accurate to a minute, that is, the year, the month, the day, the hour, and the minute; the time information can be further accurate to a second, that is, the year, the month, the day, the hour, the minute, and the second.

It is need to be noted that a time unit of the time information is not limited in the present invention.

The position information includes but is not limited to the latitude, the longitude, and the geographic position.

It is need to be noted that a server in the present invention can be any kind of server, which includes but is not limited to a physical server and a virtual server. Wherein, the virtual server can be a cloud server.

It is need to be noted that a connection between a terminal and the server can be established by any type of wired connection method, or by any type of wireless connection method. The wireless connecting mode includes but is not limited to a Blue Tooth connection mode, a Wi-Fi (Wireless Fidelity) connection mode, a 3G (The Third Generation Mobile Communication Technology) connection mode, a 4G (The Fourth Generation Mobile Communication Technology) connection mode, and a 5G connection mode (The Fifth Generation Mobile Communication Technology).

In a step 102, when the terminal uploads a picture corresponding to the environmental noise, detecting whether the picture is a valid picture or not;

the server detect whether the terminal uploads the picture corresponding to the environmental noise, when the terminal uploads the picture corresponding to the environmental noise, establishing a corresponding relationship between the picture and the environmental noise, and recording and storing the corresponding relationship.

In a step 103, when the picture is a valid picture and the position where the picture is taken lies indoor, identifying the environmental noise as an indoor environmental noise;

identifying the content of the picture by adopting a picture recognition algorithm, using the uploaded image as input of image recognition algorithm, and if output of image recognition algorithm shows it's an indoor image, it means the environmental noise uploaded by the terminal is the indoor environmental noise.

In a step 104, when the picture does not exist, identifying the environmental noise as an outdoor environmental noise; or when the picture is a valid picture, identifying the environmental noise as the outdoor environmental noise; or when the picture is a valid picture and the position where the picture is taken lies outdoor, identifying the environmental noise as the outdoor environmental noise;

identifying the content of the picture by using the picture recognition algorithm, using the uploaded image as input of image recognition algorithm, and if output of image recognition algorithm shows it's an indoor image, it means the environmental noise uploaded by the terminal is the outdoor environmental noise.

In a step 105, drawing a noise map according to the indoor environmental noise and the outdoor environmental noise.

The noise map includes a noise volume, a time, a longitude, and a latitude corresponding to the noise value.

In a drawing area, for drawing the noise map, drawing the indoor environmental noise in an indoor area, and drawing the outdoor environmental noise in an outdoor area, the indoor area and the outdoor area are different areas of the drawing area respectively.

In the embodiment of the present invention, the noise map is drawn according to the indoor environmental noise and the outdoor environmental noise, a noise relating the described position of the noise map can then be more accurate, thereby improving drawing accuracy of the noise map, and improving reliability of the noise map as well. While the outdoor noise map is needed merely, the indoor environmental noise value can be ignored directly, so that the outdoor noise map can be obtained more quickly and more accurately.

Embodiment Two

Figure 2:
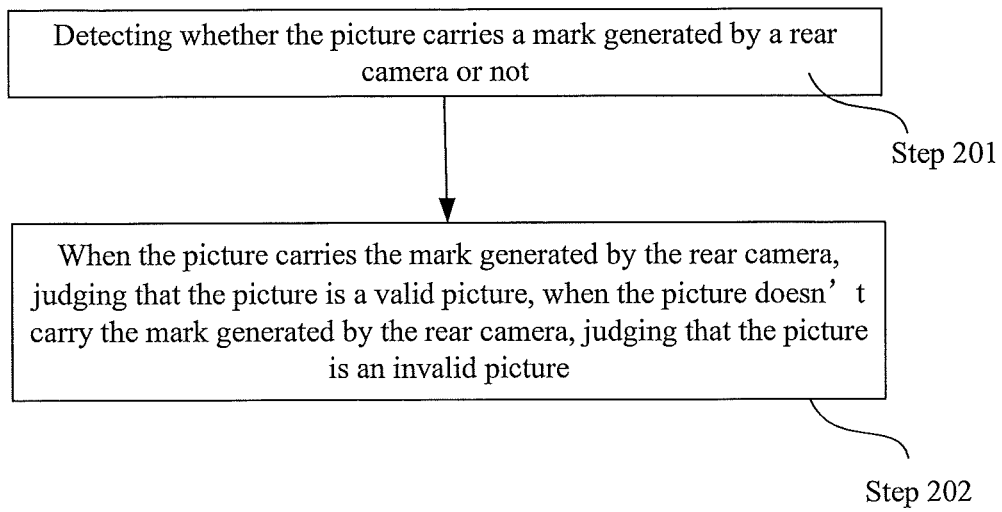
FIG. 2 illustrates an implementation flow chart of a step 102 of a method for drawing a noise map according to an embodiment of the present invention.

FIG. 2 is a flow chart for implementing the step 102 in the method for drawing a noise map provided by an embodiment (e.g., the above Embodiment One) of the present invention, the detail of which is explained as follows:

in a step 201, detecting whether the picture carries a mark generated by a rear camera;

in a step 202, when the picture carries the mark generated by the rear camera, judging that the picture is a valid picture; and when the picture doesn't carry the mark generated by the rear camera, judging that the picture is an invalid picture.

When the picture carries the mark generated by the rear camera, it means the picture is generated by invoking the rear camera of the terminal, judging that the picture is valid;

When the picture doesn't carry the mark generated by the rear camera, it means the picture is not generated by invoking the rear camera of the terminal, judging that the picture is invalid.

In the embodiment of the present invention, pictures uploaded by the terminal are sorted by valid pictures and invalid pictures, so that it is convenient for obtaining the indoor environmental noise subsequently according to the valid pictures, and thus an effectiveness of the indoor environmental noise is improved.

Embodiment Three

Configuring an environmental noise mining model, the environmental noise mining model comprises at least one selected from an environmental noise clustering model, a noise decibel mean value model, and a noise weighted mean value model.

wherein, the environmental noise clustering model is:

$$\Delta = \sqrt[\partial]{\sum_{i,m}\left(\sum_{j}\gamma_i \mid ?\theta_{ij}\ \theta_{mj}\mid^{\partial}\right)}$$

wherein in the environmental noise clustering model, a symbol $\Delta$ represents similarity, a symbol $\partial$ represents times of rooting, a symbol $\theta_{ij}$ represents a noise value of a jth dimension of a ith vector quantity, a symbol $\theta_{mj}$ represents a jth dimension data of a mth type center, a symbol $\gamma$ represents a weighted coefficient, and $\Sigma_i \gamma = 1$;

wherein,

∂ is equal to one urban area distance

∂ is equal to two Euclidean geometry distances

∂ is equal to Minkowski distance

Obtaining the similarity among a plurality of noises when distances vary by regulating the value of ∂.

Noise values in each dimension can be given different weighted mean values respectively, so that robustness and continuability of the aforesaid algorithm can be reflected.

It is need to be noted that: when the environmental noise is far from the target position gradually, the value of $\gamma$ decreases, and when the environmental noise is more and more close to the target position, the value of $\gamma$ increases; when the value of a time difference between a time when the environmental noise is obtained and a current time increases, the value of $\gamma$ decreases; and when the value of a time difference between a time when the environmental noise is obtained and a current time decreases, the value of $\gamma$ increases.

Wherein a plurality of noise values can be collected in a certain time range or a certain geographical scope, each noise value can be clustered as single one-dimensional data, when the similarity Δ is less than a preset threshold value, it means that a cluster type can describe the clustered one-dimensional data, and thus the obtained cluster type is considered as the noise value in the time range and in the geographical scope;

wherein it is possible to make vector quantities stored in the cloud to serve as one group of under-clustered data as well, and the obtained cluster type is considered as a noise value in the time range and in the geographical scope, in this way, a position and a time point corresponding to the noise value can be obtained finally.

Wherein, the noise decibel mean value model is:

$$\text{value} = \frac{\Sigma \text{ value}_i}{n};$$

wherein a symbol value represents an mean value of noise decibel, a symbol $\text{value}_i$ represents a noise value of a ith environmental noise, a symbol n represents the number of environmental noises;

Wherein, the noise weighted mean value model is:

$$\text{value}' = \frac{\Sigma \, \omega_i \times \text{value}_i}{n};$$

wherein a symbol value' represents a noise weighted mean value, a symbol $\text{value}_i$ represents the noise value of the ith environmental noise, and $\Sigma \omega_i = 1$.

In the present embodiment, when each environmental noise is collected, both the distance between the environmental noise and the target position and the time difference between the time when the environmental noise is obtained and the current time are known, however, an environmental noise, which is farther and farther from the target position and the time when it is obtained is much earlier, has a less important reference value. Thus, by assigning a weighted mean value for each noise value in each environmental noise according to different distances and different time ranges and generating noise weighted mean values according to those noise values having weighted mean values, the situation that a current described noise decibel value becomes invalid in short time can be avoided. Meanwhile, the condition that the environmental noise can't be identified when the target position possesses a larger area can also be avoided, so that an environmental noise of the target position in a certain time range can be described effectively.

Embodiment Four

Figure 3:
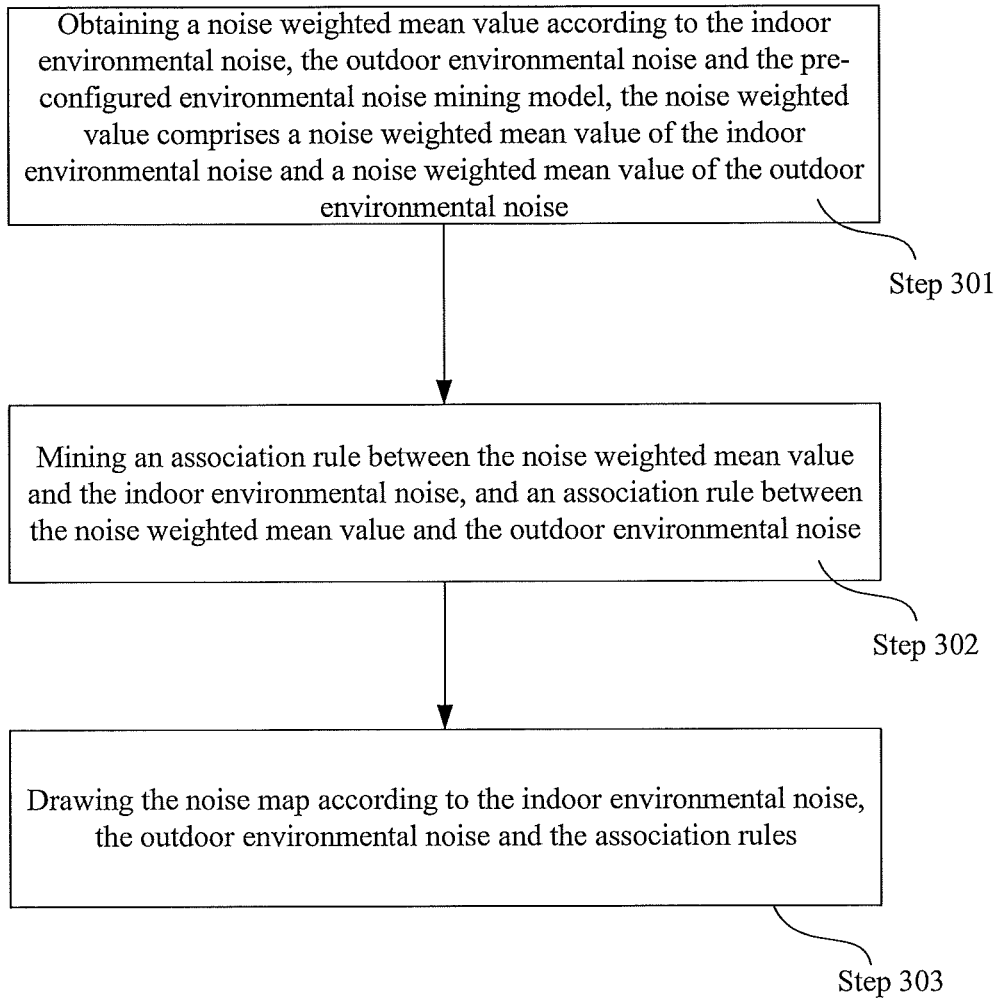
FIG. 3 illustrates an implementation flow chart of a step 103 of a method for drawing a noise map according to an embodiment of the present invention.

FIG. 3 is a flow chart for implementing step 103 in a method for drawing a noise map provided by the embodiment of the present invention, the detail of which is explained as follows:

In a step 301, obtaining a noise weighted mean value according to the indoor environmental noise, the outdoor environmental noise, and the pre-configured environmental noise mining model, the noise weighted mean value comprises a noise weighted mean value of the indoor environmental model and a noise weighted mean value of the outdoor environmental noise;

obtaining the noise weighted mean value of the indoor environmental noise according to the indoor environmental noise and the pre-configured noise weighted mean value model, obtaining the noise weighted mean value of the outdoor environmental noise according to the outdoor environmental noise and the pre-configured noise weighted mean value model.

In a step 302, mining an association rule between the noise weighted mean value and the indoor environmental noise, the outdoor environmental noise;

any one of existing data mining algorithms can be adopted in order to mine an association rule between the noise weighted mean value of the indoor environmental noise and the indoor environmental noise, and mine an association rule between the noise weighted mean value of the outdoor environmental noise, and the outdoor environmental noise.

In a step 303, drawing a noise map according to the indoor environmental noise, the outdoor environmental noise, and the association rules.

Drawing the noise map according to the mined association rule between the noise weighted mean value of the indoor environmental noise and the indoor environmental noise, and the mined association rule between the noise weighted mean value of the outdoor environmental noise and the outdoor environmental noise.

Selecting a newly mined noise weighted mean value according to the time when the noise weighted mean value is mined, displaying a geographical position, a time, and the newly mined noise weighted mean value, the noise weighted mean value comprises the noise weighted mean value of the indoor environmental noise and the noise weighted mean value of the outdoor environmental noise.

In the present embodiment, by displaying the geographical position, the time, and the newly analytic noise weighted mean value in the noise map, the effectiveness and the accuracy of the noise map is further improved.

Embodiment Five

The embodiment of the present invention mainly describes an implementation flow chart of a method for drawing a noise map in actual application, the detail of which is explained as follows:

1. collecting environmental noises via a terminal, specifically, information including time, a position, a longitude and a latitude, and a noise volume need to be recorded, the time is metered by a minute, that is, the year, the month, the day, the hour, and the minute are recorded; meanwhile, the terminal is allowed to take a picture via an intelligent terminal and upload the picture with a current location where the picture is taken.

2. when the terminal uploads the picture, judging whether the picture is a valid picture or not;

wherein, if the terminal invokes a rear camera of the intelligent terminal before the picture is sent out, judging that the picture is a valid picture; if the picture sent out by the terminal is from a local picture gallery, or is generated by a front camera of the intelligent terminal, judging the picture is an invalid picture.

3. pre-sorting the collected environmental noises by indoor environmental noises and outdoor environmental noises;

a method for processing indoor environmental noises is explained in detail as follows:

by using image analysis and geographic coordinate comparison technology, environmental noises are sorted by geographic position. Environmental noise are sorted by different dimensions, the first dimension is a season/month dimension, the second dimension is a time dimension, the third dimension is a legal holiday dimension, and the fourth dimension is a geographic position dimension. Then, environmental noises of different dimensions are analyzed via an environmental noise mining algorithm, and a noise reference value/experience value of a certain building in a certain time interval of a certain day in a certain season can be obtained.

a method for processing outdoor environmental noise is explained in detail as follows:

firstly, sorting environmental noise by different dimensions, the first dimension is a season/month dimension, the second dimension is a time dimension, the third dimension is a legal holiday dimension, and the fourth dimension is a geographic position dimension.

Secondly, by being divided in dimensions, the collected environmental noises constitute an environmental noise library. Then, environmental noises of different dimensions are analyzed by the environmental noise mining algorithm, and a noise reference value/experience value of a certain building in a certain time interval of a certain day in a certain season can be obtained.

Fourthly, marking the noise value obtained after analysis on a corresponding position of a noise map, and a location-related noise map is then obtained; this noise map has different appearances in different dimensions. Meanwhile, in order to simplify the noise map, concrete values of noises can be divided into a high level, an intermediate level and a low level, the levels correspond to different colors; on a noise distribution map, the terminal is marked with different noise values in the form of different colors.

Fifth, when a new environmental noise is uploaded, the value displayed on the noise map doesn't change immediately, however, a new value will be input into the environmental noise library. Afterwards, it is analyzed to confirm a position of the new value in the environmental noise library. When the new value increases to a certain extent, or after a fixed time interval, a new noise reference value/experience value is calculated by a machine learning algorithm.

Sixthly, when the terminal is instructed to check a current environmental noise of a certain place, obtaining newly uploaded multi groups of environmental noises around the place, and calculating an mean value and a variance of these environmental noises; when the variance value is smaller, returning the mean value of the environmental noises to the terminal; when the variance value is bigger, it means that a noisy environment of the place has changed suddenly, therefore, when returning the mean value of these environmental noises to the terminal, notifying the terminal a condition that the noisy environment of the place has changed suddenly.

Embodiment Six

The embodiment of the present invention mainly describes a preferred implementation flow chart in three different scenes, the detail of which is explained in detail as follows:

The first scene, that is, a scene in which a location-related noise map is obtained, the first scene is explained in detail as follows:

collecting environmental noises via a terminal, specifically, information including time, a position, a longitude and a latitude, and a noise volume need to be recorded, the time is metered by minute, that is, the year, the month, the day, the hour, and the minute are recorded; meanwhile, the terminal is allowed to take a picture via an intelligent terminal and upload the picture with a current location where the picture is taken.

when the terminal uploads the picture, judging whether the picture is a valid picture or not;

wherein, if the terminal invokes a rear camera of the intelligent terminal before the picture is sent out, judging that the picture is a valid picture, if the picture sent out by the terminal is from a local picture gallery, or is generated by a front camera of the intelligent terminal, judging that the picture is an invalid picture.

Pre-sorting the collected environmental noises by indoor environmental noises and outdoor environmental noises.

A method for processing indoor environmental noises is explained in detail as follows:

by using image analysis and geographic coordinate comparison technology, environmental noises are sorted by geographic position. Environmental noise are sorted by different dimensions, the first dimension is a season/month dimension, the second dimension is a time dimension, the third dimension is a legal holiday dimension, and the fourth dimension is a geographic position dimension. Then, environmental noises of different dimensions are analyzed via an environmental noise mining algorithm, and a noise reference value/experience value of a certain building in a certain time interval of a certain day in a certain season can be obtained.

A method for processing outdoor environmental noise is explained in detail as follows:

firstly, sorting environmental noise by different dimensions, the first dimension is a season/month dimension, the second dimension is a time dimension, the third dimension is a legal holiday dimension, and the fourth dimension is a geographic position dimension.

via being divided in dimensions, the collected environmental noise constitutes an environmental noise library. Then, environmental noises of different dimensions are analyzed by the environmental noise mining algorithm, and a noise reference value/experience value of a certain building in a certain time interval of a certain day in a certain season can be obtained.

Marking the noise value obtained after analysis on a corresponding position of a noise map, and a location-related noise map is then obtained; this noise map has different appearances in different dimensions. Meanwhile, in order to simplify the noise map, concrete values of noises can be divided into a high level, an intermediate level and a low level, the levels correspond to different colors; on a noise distribution map, the terminal is marked with different noise values in the form of different colors.

The second scene, in which a current noisy environment in a certain place is checked by a user, the detail of the scene is explained as follows:

obtaining recently uploaded one hundred groups of environmental noises around the current place;

calculating an mean value and a variance of the one hundred groups of environmental noises;

when the variance of the one hundred groups of environmental noises is less than a preset threshold value, returning the mean value of these one hundred groups of environmental noises as the current noise value of the place back to the user.

The third scene, in which the whole noise map is checked by the user, is explained in the following:

selecting the noise map at the present time in the present season and returning the noise map back to the user;

by zooming in the noise map displayed in a device by the user, a noise value of a position corresponding to the noise map displayed in the device is read out from a cloud, and then the read-out noise value is transmitted back to the device, and displayed at the position corresponding to the current noise map;

when the user decides to enter a certain building and check a noise distribution condition therein, the cloud is switched automatically to noise value data inside the building, reads noise values everywhere inside the building from the noise value data inside the building, and displays the read noise values on a current user interface, so that it is convenient for the user to perform noise value data checking.

Embodiment Seven

Figure 4:
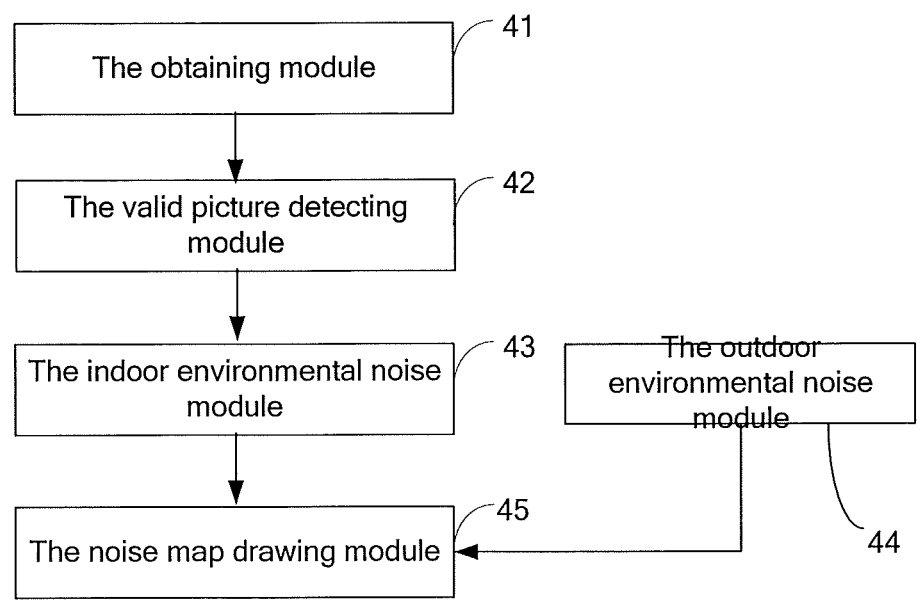
FIG. 4 illustrates a first structural block diagram of a device for drawing a noise map according to an embodiment of the present invention.

FIG. 4 is a first structural block diagram of a device for drawing a noise map provided by an embodiment of the present invention, the device for drawing a noise map can be operated in a server. For convenient interpretation, only those parts related to the present embodiment are illustrated.

Please refer to FIG. 4, the device for drawing a noise map comprises:

an obtaining module 41 configured for obtaining an environmental noise uploaded by a terminal, the environmental noise comprises a noise value, time information and position information;

a valid picture detecting module 42 configured for detecting whether the picture is a valid picture or not when the terminal uploads a picture corresponding to the environmental noise;

an indoor environmental noise module 43 configured for identifying the environmental noise as an indoor environmental noise when the picture is valid and the position where the picture is taken lies indoor;

an outdoor environmental noise module 44 configured for identifying the environmental noise as an outdoor environmental noise when the picture does not exist, or when the picture is invalid, or when the picture is valid and the position where the picture is taken lies outdoor;

and a noise map drawing module 45 configured for drawing a noise map according to the indoor environmental noise and the outdoor environmental noise.

Figure 5:
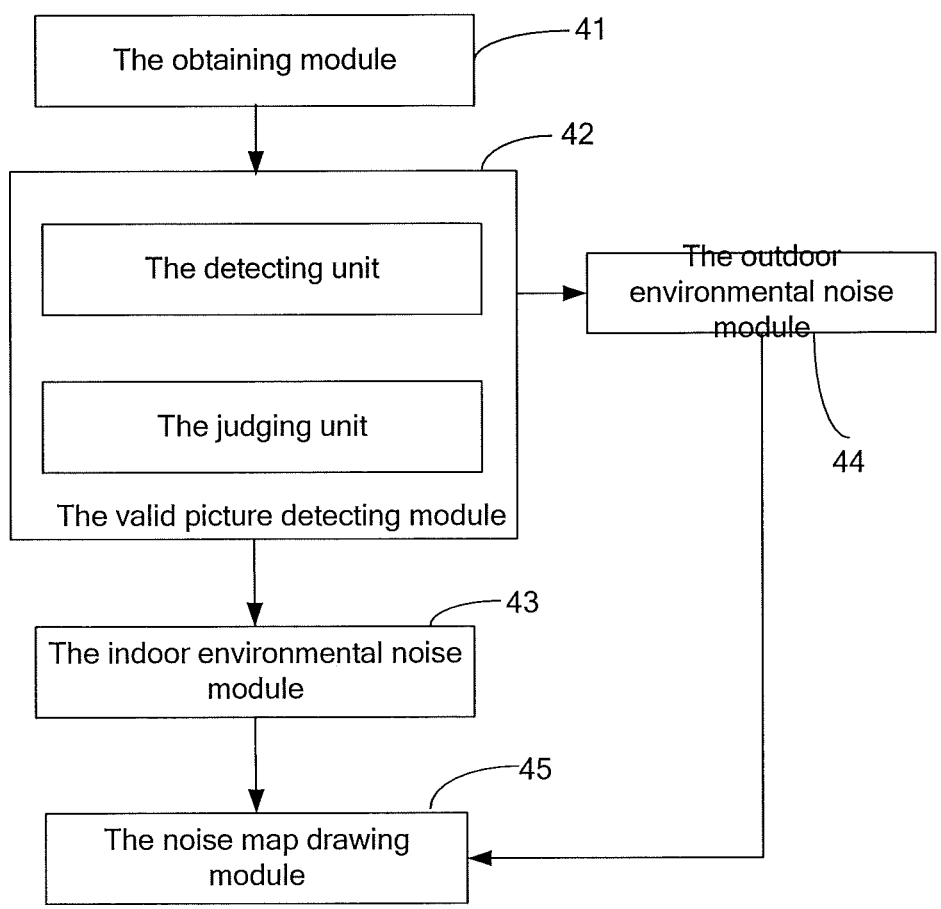
FIG. 5 illustrates a second structural block diagram of the device for drawing a noise map according to an embodiment of the present invention.

In one implementation model of the present embodiment, please refer to FIG. 5, FIG. 5 is a second structural block diagram of the device for drawing a noise map provided by the embodiment of the present invention, in the device for drawing a noise map, the valid picture detecting module 42 comprises:

a detecting unit 421 configured for detecting whether the picture carries a mark generated by a rear camera;

and a judging unit 422 configured for judging the picture is a valid picture when the picture carries the mark generated by the rear camera, and judging that the picture is a invalid picture when the picture doesn't carry the mark generated by the rear camera.

In another implementation model of the present embodiment, in the device for drawing a noise map, the noise map drawing module 45 is specifically configured for drawing the noise map according to the indoor environmental noise, the outdoor environmental noise and the pre-configured environmental noise mining model, the environmental noise mining model comprises at least one selected from an environmental noise clustering model, a noise decibel mean value model and a noise weighted mean value model.

Figure 6:
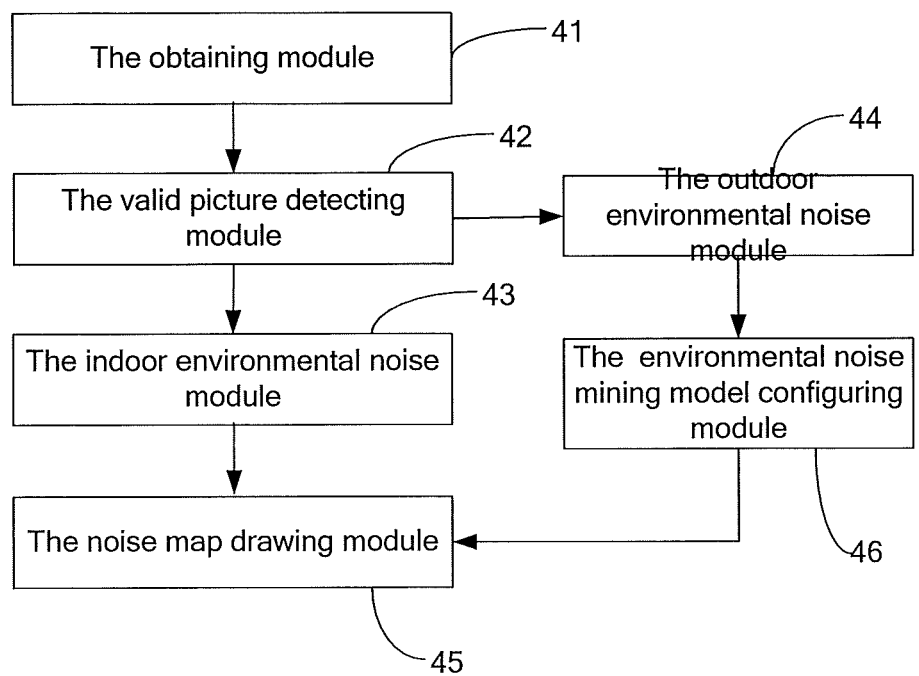
FIG. 6 illustrates a third structural block diagram of the device for drawing a noise map according to an embodiment of the present invention.

In another implementation model of the present embodiment, please refer to FIG. 6, FIG. 6 is a third structural block diagram of the device for drawing a noise map provided by the embodiment of the present invention, the device for drawing a noise map further comprises:

an environmental noise mining model configuring module 46 configured for configuring the environmental noise mining model, the environmental noise mining model comprises at least one selected from an environmental noise clustering model, a noise decibel mean value model, and a noise weighted mean value model; wherein, the environmental noise clustering model is:

$$\Delta = \sqrt[\partial]{\sum_{i,m} \left( \sum_j \gamma_i \mid ? \theta_{ij} \; \theta_{mj} \mid^\partial \right)}$$

wherein in the environmental noise clustering model, a symbol $\Delta$ represents similarity, a symbol $\partial$ represents times of rooting, a symbol $\theta_{ij}$ represents a noise value of a jth dimension of a ith vector quantity, a symbol $\theta_{mj}$ represents a jth dimension data of a mth type center, a symbol $\gamma$ represents a weighted coefficient, and $\Sigma_i \, \gamma = 1$;

wherein the noise decibel mean value model is:

$$\text{value} = \frac{\Sigma \, \text{value}_i}{n};$$

wherein a symbol value represents an mean value of noise decibel, a symbol $\text{value}_i$ represents a noise value of a ith environmental noise, a symbol n represents the number of environmental noise;

wherein the noise weighted mean value model is:

$$\text{value}' = \frac{\Sigma \, \omega_i \times \text{value}_i}{n};$$

wherein a symbol value' represents a noise weighted mean value, a symbol $\text{value}_i$ represents the noise value of the ith environmental noise, and $\Sigma \omega_i = 1$.

Figure 7:
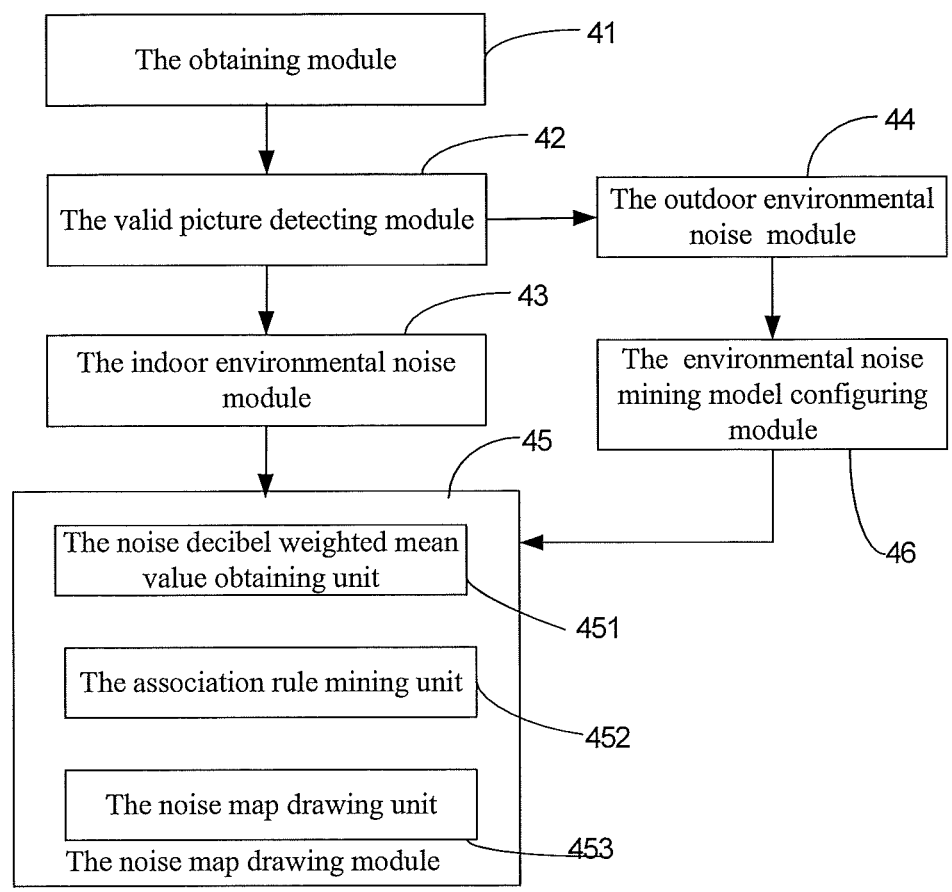
FIG. 7 illustrates a fourth structural block diagram of the device for drawing a noise map according to an embodiment of the present invention.

In another implementation model of the present embodiment, please refer to FIG. 7, FIG. 7 is a fourth structural diagram of a device for drawing a noise map provided by the present embodiment, in the device for drawing a noise map 45, the device for drawing a noise map 45 further comprises:

a noise weighted mean value obtaining unit 451 configured for obtaining a noise weighted mean value according to the indoor environmental noise, the outdoor environmental noise and the pre-configured environmental noise mining model, the noise weighted mean value comprises a noise weighted mean value of the indoor environmental noise and a noise weighted mean value of the outdoor environmental noise;

an association rule mining unit 452 configured for mining an association rule between the noise weighted mean value and the indoor environmental noise, the outdoor environmental noise;

and a noise map drawing unit 453 configured for drawing the noise map according to the indoor environmental noise, the outdoor environmental noise, and the association rule.

The device for drawing a noise map provided by the present embodiment can be applied in aforesaid method for drawing a noise map embodiment corresponding to the device for drawing a noise map, for detail, please refer to the description of aforesaid embodiments, it is not repeated herein.

Via a description of aforementioned implementation model, for those skilled in the art, it is understood clearly that the present invention can be implemented with the help of a software adding necessary general hardware. Procedures of the software can be stored in a storage medium, the storage medium, such as, RAM (Random Access Memory), Flash Memory, ROM (Read Only Memory), PROM (Programmable Read Only Memory), EEPROM (Electrically-Erasable Programmable Read Only Memory), Register, and so on. The storage medium is within a memorizer, a processor reads information stored in the memory and executes the methods in foregoing embodiments of the present invention.

Foregoing contents are some preferable embodiments of the present invention merely, and are not regarded as being limitation to the protection scope of the present invention, for those skilled in the prior technical field, within the technical scope disclosed in the present invention, those modifications or equivalent replacement to be thought easily should all fall within the protection scope of the present invention. Thus, the protection scope of the present invention should be subject to the protection scope of the claims.

The invention claimed is:

1. A method for drawing a noise map, comprising:
    obtaining an environmental noise uploaded by a terminal, the environmental noise comprises a noise volume, time information, and position information;
    when the terminal uploads a picture corresponding to the environmental noise, detecting whether the picture is a valid picture or not;
    when the picture is a valid picture and the position where the picture is taken lies indoor, identifying the environmental noise as an indoor environmental noise;
    when the picture does not exist, identifying the environmental noise as an outdoor environmental noise; or when the picture is an invalid picture, identifying the environmental noise as the outer door environmental noise; or when the picture is a valid picture and the position where the picture is taken lies outdoor, identifying the environmental noise as the outdoor environmental noise;
    drawing a noise map according to the indoor environmental noise and the outdoor environmental noise.

2. The method for drawing a noise map according to claim 1, wherein the step of when the terminal uploads the picture corresponding to the environmental noise, detecting and determining whether the picture comprises:
    detecting whether the picture carries a mark generated by a rear camera or not;
    when the picture carries the mark generated by the rear camera, judging that the picture is a valid picture, and when the picture doesn't carry the mark generated by the rear camera, judging that the picture is an invalid picture.

3. The method for drawing a noise map according to claim 1, wherein the step of generating the noise map according to the indoor environmental noise and the outdoor environmental noise comprises:
    drawing the noise map according to the indoor environmental noise, the outdoor environmental noise and a pre-configured environmental noise mining model, the environmental noise mining model comprises at least one selected from an environmental noise clustering model, a noise decibel mean value model, and a noise weighted mean value model.

4. The method for drawing a noise map according to claim 1, wherein before the step of drawing the noise map according to the indoor environmental noise, the outdoor environmental noise and the pre-configured environmental noise mining model, the method for drawing a noise map further comprises:
    configuring the environmental noise mining model, the environmental noise mining model comprises at least one selected from the environmental noise clustering model, the noise decibel mean value model, and the noise weighted mean value model;
    wherein the environmental noise clustering model is:

$$\Delta = \sqrt[\partial]{\sum_{i,m} \left( \sum_j \gamma_i \, |\theta_{ij} - \theta_{mj}|^\partial \right)}$$

wherein in the environmental noise clustering model, a symbol $\Delta$ represents similarity, a symbol $\partial$ represents times of rooting, a symbol $\theta_{ij}$ represents a noise value of a jth dimension of a ith vector quantity, a symbol $\theta_{mj}$ represents a jth dimension data of a mth type center, a symbol $\gamma$ represents a weighted coefficient, and $\Sigma_i \gamma = 1$;
wherein the noise decibel mean value model is:

$$\text{value} = \frac{\Sigma \, \text{value}_i}{n};$$

wherein a symbol value represents an mean value of noise decibel, a symbol $\text{value}_i$ represents a noise value of a ith environmental noise, a symbol n represents the number of environmental noise;
wherein the noise weighted mean value model is:

$$\text{value}' = \frac{\Sigma \, \omega_i \times \text{value}_i}{n};$$

wherein a symbol value' represents a noise weighted mean value, a symbol $\text{value}_i$ represents the noise value of the ith environmental noise, and $\Sigma \omega_i = 1$.

5. The method for drawing a noise map according to claim 3, wherein the step of when the environmental noise mining model applies the noise weighted mean value model, drawing the noise map according to the indoor environmental noise, the outdoor environmental noise and the pre-configured environmental noise mining model comprises:
  obtaining a noise weighted mean value according to the indoor environmental noise, the outdoor environmental noise and the pre-configured environmental noise mining model, the noise weighted mean value comprises a noise weighted mean value of the indoor environmental noise and a noise weighted mean value of the outdoor environmental noise;
  mining an association rule between the noise weighted mean value and the indoor environmental noise and an association rule between the noise weighted mean value and the outdoor environmental noise;
  drawing the noise map according to the indoor environmental noise, the outdoor environmental noise and the association rules.

6. A device for drawing a noise map, comprising:
  an obtaining module configured for obtaining an environmental noise uploaded by a terminal, the environmental noise comprises a noise value, a time information and a position information;
  a valid picture detecting module configured for detecting whether the picture is a valid picture or not when the terminal uploads a picture corresponding to the environmental noise;
  an indoor environmental noise module configured for identifying the environmental noise as an indoor environmental noise when the picture is valid and the position where the picture is taken lies indoor;
  an outdoor environmental noise module configured for identifying the environmental noise as an outdoor environmental noise when the picture does not exist, or when the picture is invalid, or when the picture is valid and the position where the picture is taken lies outdoor; and
  a noise map drawing module configured for drawing a noise map according to the indoor environmental noise and the outdoor environmental noise.

7. The device for drawing a noise map according to claim 6, wherein the noise map drawing module is specifically configured for drawing the noise map according to the indoor environmental noise, the outdoor environmental noise and the pre-configured environmental noise mining model, the environmental noise mining model comprises at least one selected from an environmental noise clustering model, a noise decibel mean value model and a noise weighted mean value model.

8. The device for drawing a noise map according to claim 7, wherein the device for drawing a noise map further comprises:
  an environmental noise mining model configuring module configured for configuring the environmental noise mining model, the environmental noise mining model comprises at least one selected from an environmental noise clustering model, a noise decibel mean value model, and a noise weighted mean value model;
wherein the environmental noise clustering model is:

$$\Delta = \sqrt[\partial]{\sum_{i,m}\left(\sum_j \gamma_i \left|\theta_{ij} - \theta_{mj}\right|^\partial\right)}$$

wherein in the environmental noise clustering model, a symbol $\Delta$ represents similarity, a symbol $\partial$ represents times of rooting, a symbol $\theta_{ij}$ represents a noise value of a jth dimension of a ith vector quantity, a symbol $\theta_{mj}$ represents a jth dimension data of a mth type center, a symbol $\gamma$ represents a weighted coefficient, and $\Sigma_i \gamma=1$;
wherein the noise decibel mean value model is:

$$\text{value} = \frac{\Sigma \text{ value}_i}{n};$$

wherein a symbol value represents an mean value of noise decibel, a symbol $\text{value}_i$ represents a noise value of a ith environmental noise, a symbol n represents the number of environmental noise;
wherein the noise weighted mean value model is:

$$\text{value}' = \frac{\Sigma\, \omega_i \times \text{value}_i}{n};$$

wherein a symbol value' represents a noise weighted mean value, a symbol $\text{value}_i$ represents the noise value of the ith environmental noise, and $\Sigma\omega_i=1$.

9. The device for drawing a noise map according to claim 7, wherein the noise map drawing module comprises:
  a noise weighted mean value obtaining unit configured for obtaining a noise weighted mean value according to the indoor environmental noise, the outdoor environmental noise and the pre-configured environmental noise mining model, the noise weighted mean value comprises a noise weighted mean value of the indoor environmental noise and a noise weighted mean value of the outdoor environmental noise;
  an association rule mining unit configured for mining an association rule between the noise weighted mean value and the indoor environmental noise, and an association rule between the noise weighted mean value and the outdoor environmental noise; and
  a noise map drawing unit configured for drawing the noise map according to the indoor environmental noise, the outdoor environmental noise, and the association rule.

10. The method for drawing a noise map according to claim 4, wherein the step of when the environmental noise mining model applies the noise weighted mean value model, drawing the noise map according to the indoor environmental noise, the outdoor environmental noise and the pre-configured environmental noise mining model comprises:
  obtaining a noise weighted mean value according to the indoor environmental noise, the outdoor environmental noise and the pre-configured environmental noise mining model, the noise weighted mean value comprises a noise weighted mean value of the indoor environmental noise and a noise weighted mean value of the outdoor environmental noise;
  mining an association rule between the noise weighted mean value and the indoor environmental noise and an association rule between the noise weighted mean value and the outdoor environmental noise;
  drawing the noise map according to the indoor environmental noise, the outdoor environmental noise and the association rules.

11. The device for drawing a noise map according to claim 6, wherein the valid picture detecting module comprises:

a detecting unit configured for detecting whether the picture carries a mark generated by a rear camera or not; and a judging unit configured for judging that the picture is a valid picture when the picture carries the mark generated by the rear camera, and judging that the picture is an invalid picture when the picture doesn't carry the mark generated by the rear camera.

12. The device for drawing a noise map according to claim 8, wherein the noise map drawing module comprises:

a noise weighted mean value obtaining unit configured for obtaining a noise weighted mean value according to the indoor environmental noise, the outdoor environmental noise and the pre-configured environmental noise mining model, the noise weighted mean value comprises a noise weighted mean value of the indoor environmental noise and a noise weighted mean value of the outdoor environmental noise;

an association rule mining unit configured for mining an association rule between the noise weighted mean value and the indoor environmental noise, and an association rule between the noise weighted mean value and the outdoor environmental noise; and a noise map drawing unit configured for drawing the noise map according to the indoor environmental noise, the outdoor environmental noise, and the association rule.

* * * * *

UNITED STATES PATENT AND TRADEMARK OFFICE
CERTIFICATE OF CORRECTION

PATENT NO. : 9,728,204 B2  
APPLICATION NO. : 14/908072  
DATED : August 8, 2017  
INVENTOR(S) : Song et al.

Page 1 of 1

It is certified that error appears in the above-identified patent and that said Letters Patent is hereby corrected as shown below:

On the Title Page

Item (73) Assignee: Delete "SHENZHEN GRANDSUN ELECTRIC CO., LTD." and insert --SHENZHEN GRANDSUN ELECTRONIC CO., .LTD.--.

Signed and Sealed this  
Twenty-sixth Day of May, 2020

Andrei Iancu  
*Director of the United States Patent and Trademark Office*